(12) United States Patent
Luo et al.

(10) Patent No.: US 10,681,786 B2
(45) Date of Patent: Jun. 9, 2020

(54) TWO-TERMINAL INTEGRATED CIRCUITS WITH TIME-VARYING VOLTAGE-CURRENT CHARACTERISTICS INCLUDING PHASED-LOCKED POWER SUPPLIES

(71) Applicant: ON-BRIGHT ELECTRONICS (SHANGHAI) CO., LTD., Shanghai (CN)

(72) Inventors: Qiang Luo, Shanghai (CN); Liqiang Zhu, Shanghai (CN); Zhiliang Chen, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 15/836,588

(22) Filed: Dec. 8, 2017

(65) Prior Publication Data

US 2018/0103515 A1 Apr. 12, 2018

Related U.S. Application Data

(63) Continuation of application No. 15/184,821, filed on Jun. 16, 2016, now Pat. No. 9,883,557.

(30) Foreign Application Priority Data

May 23, 2016 (CN) .......................... 2016 1 0345806

(51) Int. Cl.
*H05B 45/37* (2020.01)
*H05B 45/48* (2020.01)
*H05B 45/395* (2020.01)

(52) U.S. Cl.
CPC ........... *H05B 45/37* (2020.01); *H05B 45/395* (2020.01); *H05B 45/48* (2020.01)

(58) Field of Classification Search
CPC ............ H05B 33/0815; H05B 33/0812; H05B 33/083
(Continued)

(56) References Cited

U.S. PATENT DOCUMENTS

| 2,502,488 A | 4/1950 | Shockley |
| 3,138,743 A | 6/1964 | Kilby |

(Continued)

FOREIGN PATENT DOCUMENTS

| CN | 104022648 | 9/2014 |
| CN | 105120571 | 12/2015 |

(Continued)

OTHER PUBLICATIONS

"2-Terminal IC 1.2 V Reference AD589", Analog Devices Data Sheet, 2004 Rev. C, pp. 1-8 (Year: 2004).*

(Continued)

*Primary Examiner* — Daniel D Chang
(74) *Attorney, Agent, or Firm* — Faegre Drinker Biddle & Reath LLP

(57) ABSTRACT

A two-terminal IC chip and method thereof. For example, a two-terminal IC chip includes a first chip terminal and a second chip terminal. A first terminal voltage is a voltage of the first chip terminal, a second terminal voltage is a voltage of the second chip terminal, and a chip voltage is equal to a difference between the first terminal voltage and the second terminal voltage. The chip is configured to allow a chip current to flow into the chip at the first chip terminal and out of the chip at the second chip terminal, or to flow into the chip at the second chip terminal and out of the chip at the first chip terminal. The chip current is larger than or equal to zero in magnitude. The chip is further configured to change a relationship between the chip voltage and the chip current with respect to time. The chip is an integrated circuit, and the (Continued)

chip does not include any additional chip terminal other than the first chip terminal and the second chip terminal.

34 Claims, 3 Drawing Sheets

(58) Field of Classification Search
USPC .............................. 315/186, 193, 201, 307
See application file for complete search history.

(56) References Cited

U.S. PATENT DOCUMENTS

| | | | |
|---|---|---|---|
| 8,248,145 | B2 | 8/2012 | Melanson |
| 8,502,463 | B2* | 8/2013 | Mizukawa ............ H05B 33/089 315/119 |
| 9,456,484 | B2* | 9/2016 | Liu .................... H05B 33/0809 |
| 9,883,557 | B2 | 1/2018 | Luo et al. |
| 9,900,943 | B2 | 2/2018 | Luo et al. |
| 10,231,296 | B2 | 3/2019 | Luo et al. |
| 2005/0036255 | A1 | 2/2005 | Kranz |
| 2010/0328946 | A1 | 12/2010 | Borkar et al. |
| 2011/0254468 | A1 | 10/2011 | Chen et al. |
| 2012/0286576 | A1 | 11/2012 | Jing et al. |
| 2013/0027096 | A1 | 1/2013 | Pialis et al. |
| 2013/0141003 | A1 | 6/2013 | Esaki et al. |
| 2016/0294380 | A1 | 10/2016 | Hong |
| 2017/0339757 | A1 | 11/2017 | Luo et al. |
| 2017/0339758 | A1 | 11/2017 | Luo et al. |
| 2018/0124885 | A1 | 6/2018 | Luo et al. |

FOREIGN PATENT DOCUMENTS

| | | |
|---|---|---|
| CN | 105391275 | 3/2016 |
| CN | 105979626 | 9/2016 |
| TW | 201408131 | 2/2014 |
| TW | I-452925 | 9/2014 |
| TW | M-508182 | 9/2015 |
| TW | 201603632 A | 1/2016 |
| TW | 201621861 A | 6/2016 |

OTHER PUBLICATIONS

Taiwan Intellectual Property Office, Approval Report dated Apr. 18, 2018, in Application No. 106101290.
United States Patent and Trademark Office, Office Action dated Mar. 26, 2018, in U.S. Appl. No. 15/806,070.
United States Patent and Trademark Office, Notice of Allowance dated Jul. 18, 2018, in U.S. Appl. No. 15/806,070.
Analog Devices, Inc., "Two-Terminal IC Temperature Transducer," Product Description for AD590, 1997.
Chinese Patent Office, Office Action dated Jul. 25, 2017, in Application No. 201610345806.3.
Chinese Patent Office, Office Action dated Dec. 4, 2017, in Application No. 201611142501.9.
Taiwan Intellectual Property Office, Office Action dated Mar. 22, 2017, in Taiwan Patent Application No. 105122494.
United States Patent and Trademark Office, Office Action dated Jun. 2, 2017, in U.S. Appl. No. 15/184,821.
United States Patent and Trademark Office, Notice of Allowance dated Jul. 19, 2017, in U.S. Appl. No. 15/406,293.
United States Patent and Trademark Office, Notice of Allowance dated Sep. 11, 2017, in U.S. Appl. No. 15/406,293.
United States Patent and Trademark Office, Notice of Allowance dated Oct. 27, 2017, in U.S. Appl. No. 15/184,821.
United States Patent and Trademark Office, Notice of Allowance dated Oct. 22, 2018, in U.S. Appl. No. 15/806,070.

* cited by examiner

TWO-TERMINAL INTEGRATED CIRCUITS WITH TIME-VARYING VOLTAGE-CURRENT CHARACTERISTICS INCLUDING PHASED-LOCKED POWER SUPPLIES

1. CROSS-REFERENCES TO RELATED APPLICATIONS

This application is a continuation of U.S. patent application Ser. No. 15/184,821, filed Jun. 16, 2016, which claims priority to Chinese Patent Application No. 201610345806.3, filed May 23, 2016, incorporated by reference herein for all purposes.

2. BACKGROUND OF THE INVENTION

Certain embodiments of the present invention are directed to integrated circuits. More particularly, some embodiments of the invention provide two-terminal integrated circuits with time-varying voltage-current characteristics including phase-locked power supplies. Merely by way of example, some embodiments of the invention have been applied to drivers for light emitting diodes (LEDs). But it would be recognized that the invention has a much broader range of applicability.

A single conventional integrated circuit often includes one or more electronic circuits on one or more semiconductor materials (e.g., silicon). The single conventional integrated circuit usually is referred to as an IC, a chip, and/or an IC chip. Additionally, the single conventional integrated circuit often can be made much smaller than a discrete circuit that includes one or more discrete components (e.g., discrete resistor, discrete diode, and/or discrete transistor).

Usually, a conventional IC chip includes three or more terminals that can provide interconnections between the internal circuit(s) of the chip and the external environment. Often, the conventional IC chip uses one terminal to receive a power supply, uses another terminal to provide the ground for a current loop, and uses yet another terminal to provide control for input and/or output.

For example, a conventional LED driver includes a conventional IC chip that operates in the switching-power-supply mode. The conventional IC chip includes three or more terminals (e.g., pins) and uses these terminals to support normal operations. These terminals include a pin to receive the input rectified AC power, another pin to receive the IC power supply, and yet another pin to provide input/output control, and/or to provide the chip ground. The input rectified AC power (e.g., the rectified AC voltage) often periodically becomes zero in magnitude with respect to the chip ground. In another example, the pin for the input rectified AC power is connected to a terminal of an external capacitor, and the other terminal of the external capacitor is connected to the pin for the chip ground. The external capacitor often is needed to provide the power supply to the conventional IC chip when the input rectified AC power (e.g., the rectified AC voltage) periodically becomes zero in magnitude with respect to the chip ground. In yet another example, the conventional IC chip uses the three or more terminals to work with one or more external components (e.g., an inductive winding) outside the chip and convert the received input rectified AC power to a DC power supply for the LED lamps in order to provide a constant LED current under certain control scheme. The use of external capacitor and/or one or more additional pins for the IC chip often raises the bill-of-materials (BOM) cost of the LED driver.

Hence, it is highly desirable to improve techniques for the integrated circuit that, for example, is applicable to an LED drive.

3. BRIEF SUMMARY OF THE INVENTION

Certain embodiments of the present invention are directed to integrated circuits. More particularly, some embodiments of the invention provide two-terminal integrated circuits with time-varying voltage-current characteristics including phase-locked power supplies. Merely by way of example, some embodiments of the invention have been applied to drivers for light emitting diodes. But it would be recognized that the invention has a much broader range of applicability.

According to one embodiment, a two-terminal IC chip includes a first chip terminal and a second chip terminal. A first terminal voltage is a voltage of the first chip terminal, a second terminal voltage is a voltage of the second chip terminal, and a chip voltage is equal to a difference between the first terminal voltage and the second terminal voltage. The chip is configured to allow a chip current to flow into the chip at the first chip terminal and out of the chip at the second chip terminal, or to flow into the chip at the second chip terminal and out of the chip at the first chip terminal. The chip current is larger than or equal to zero in magnitude. The chip is further configured to change a relationship between the chip voltage and the chip current with respect to time. The chip is an integrated circuit, and the chip does not include any additional chip terminal other than the first chip terminal and the second chip terminal.

According to another embodiment, a two-terminal IC chip includes a first chip terminal, a second chip terminal, and a first switch. The chip is configured to allow a chip current to flow into the chip at the first chip terminal and out of the chip at the second chip terminal, or to flow into the chip at the second chip terminal and out of the chip at the first chip terminal. The chip current is larger than or equal to zero in magnitude. The first switch is configured to receive a drive signal and be opened or closed in response to the drive signal. The chip is further configured to, in response to the first switch being opened, change the chip current from being larger than zero to being equal to zero in magnitude, and in response to the first switch being closed, change the chip current from being equal to zero to being larger than zero in magnitude. The chip is an integrated circuit, and the chip does not include any additional chip terminal other than the first chip terminal and the second chip terminal.

According to yet another embodiment, a two-terminal IC chip includes a first chip terminal, a second chip terminal, a first switch configured to receive a first signal, and a first power supply coupled to the first switch. The first switch is configured to be closed during a first time duration in response to the first signal, and to be open during a second time duration in response to the first signal. The first power supply is configured to, in response to the first switch being closed, receive a first power through the first switch and store the received first power during the first time duration, and in response to the first switch being open, not store any additional power and not allow the stored power to leak out through the first switch during the second time duration. The first power supply is further configured to output a second power during the first time duration and the second time duration. A first terminal voltage is a voltage of the first chip terminal, a second terminal voltage is a voltage of the second chip terminal, and a chip voltage is equal to a difference between the first terminal voltage and the second terminal voltage. The chip is configured to allow a chip current to flow into the chip at the first chip terminal and out of the chip at the second chip terminal, or to flow into the chip at the second chip terminal and out of the chip at the first chip terminal. The chip current is larger than or equal to zero in magnitude. The chip is further configured to, based at least in part on the second power, generate at least one selected from a group consisting of the chip voltage and the chip current. The chip is an integrated circuit, and the chip does not include any additional chip terminal other than the first chip terminal and the second chip terminal.

According to yet another embodiment, a two-terminal IC chip includes a first chip terminal and a second chip terminal. The first chip terminal is coupled to a first winding terminal of an inductive winding and a first diode terminal of a diode. The inductive winding further includes a second winding terminal, and the diode further includes a second diode terminal. A series of one or more light emitting diodes is coupled to the second winding terminal and the second diode terminal. The second winding terminal and the second diode terminal are configured to receive a rectified AC voltage. The chip is configured to receive an input voltage at the first chip terminal and generate a chip current based at least in part on the input voltage, and the chip current is larger than or equal to zero in magnitude. Additionally, the chip is further configured to allow the chip current to flow into the chip at the first chip terminal and out of the chip at the second chip terminal, or to flow into the chip at the second chip terminal and out of the chip at the first chip terminal, and change the chip current with respect to time to keep the light-emitting-diode current constant with respect to time even if the input voltage changes within a voltage range and a temperature for the chip changes within a temperature range. The chip is an integrated circuit, and the chip does not include any additional chip terminal other than the first chip terminal and the second chip terminal.

According to yet another embodiment, a two-terminal IC chip for an electronic system includes a first chip terminal and a second chip terminal. The first chip terminal is coupled to one or more components of the electronic system. The electronic system is configured to receive a first signal and generate a second signal based on at least information associated with the first signal. The chip is configured to receive an input voltage at the first chip terminal and generate a chip current based at least in part on the input voltage. The chip current is larger than or equal to zero in magnitude. Additionally, the chip is further configured to allow the chip current to flow into the chip at the first chip terminal and out of the chip at the second chip terminal, or to flow into the chip at the second chip terminal and out of the chip at the first chip terminal, and change the chip current with respect to time to keep the electronic system operating normally even if the first signal changes. The chip is an integrated circuit, and the chip does not include any additional chip terminal other than the first chip terminal and the second chip terminal.

Depending upon embodiment, one or more of these benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to integrated circuits. More particularly, some embodiments of the invention provide two-terminal integrated circuits with time-varying voltage-current characteristics including phase-locked power supplies. Merely by way of example, some embodiments of the invention have been applied to drivers for light emitting diodes. But it would be recognized that the invention has a much broader range of applicability.

According to some embodiments, for an IC chip, its terminal to provide control for input and/or output is combined with the terminal to receive a power supply or is combined with the terminal to provide the ground for a current loop. For example, the IC chip includes at most two terminals, such as a power-supply terminal and a ground terminal. In another example, these two terminals of the IC chip not only provide a current loop and/or a current flow but also automatically control an entire electronic system. In yet another example, the IC chip works as a one-input-terminal-and-one-output-terminal system.

Figure 1:
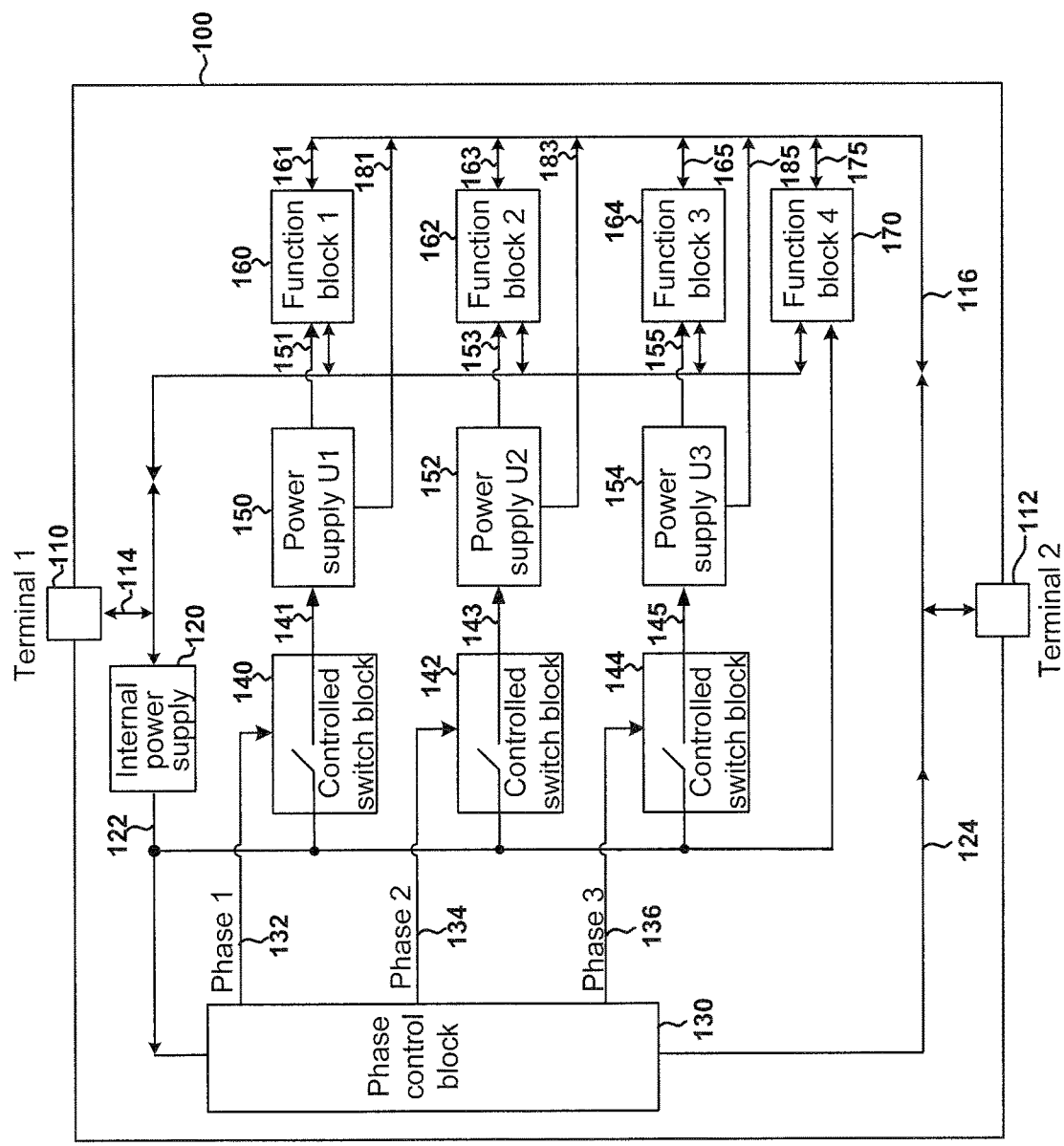
FIG. 1 is a simplified diagram showing an IC chip according to an embodiment of the present invention.

FIG. 1 is a simplified diagram showing an IC chip according to an embodiment of the present invention. This diagram is merely an example, which should not unduly limit the scope of the claims. One of ordinary skill in the art would recognize many variations, alternatives, and modifications. The IC chip 100 includes terminals 110 and 112, an internal power supply 120, a phase control block 130, controlled switch blocks 140, 142, and 144, power supplies 150, 152, and 154, and function blocks 160, 162, 164, and 170. For example, each of the terminals 110 and 112 is a pin. In another example, the phase control block 130 is a phase controller. In yet another example, each of the controlled switch blocks 140, 142, and 144 is a switch (e.g., a controlled switch). In yet another example, each of the function blocks 160, 162, 164, and 170 is a component configured to perform one or more functions.

In one embodiment, the terminal 110 receives a current and/or voltage 114 from outside the IC chip 100, and provides the received current and/or voltage 114 to one or more components within the IC chip 100, and the terminal 112 receives a current and/or voltage 124 and/or a current and/or voltage 116 from one or more components within the IC chip 100, and provides the received current and/or voltage 124 and/or the received current and/or voltage 116 to outside the IC chip 100. In another embodiment, the terminal 110 receives the current and/or voltage 114 from one or more components within the IC chip 100, and provides the received current and/or voltage 114 to outside the IC chip 100, and the terminal 112 receives the current and/or voltage 124 and/or the current and/or voltage 116 from outside the IC chip 100, and provides the received current and/or voltage 124 and/or the received current and/or voltage 116 to one or more components within the IC chip 100. In yet another embodiment, at one time, the terminal 110 receives the current and/or voltage 114 from outside the IC chip 100, and provides the received current and/or voltage 114 to one or more components within the IC chip 100, and the terminal 112 receives the current and/or voltage 124 and/or the current and/or voltage 116 from one or more components within the IC chip 100, and provide the received current and/or voltage 124 and/or the received current and/or voltage 116 to outside the IC chip 100; and at another time, the terminal 110 receives the current and/or voltage 114 from one or more components within the IC chip 100, and provides the received current and/or voltage 114 to outside the IC chip 100, and the terminal 112 receives the current and/or voltage 124 and/or the current and/or voltage 116 from outside the IC chip 100, and provides the received current and/or voltage 124 and/or the received current and/or voltage 116 to one or more components within the IC chip 100.

As shown in FIG. 1, the terminal 110 receives the current and/or voltage 114 from outside the IC chip 100, provides the received current and/or voltage 114 to the internal power supply 120 during a time duration, and provides the received current and/or voltage 114 to the function blocks 160, 162, 164, and 170 during another time duration, according to certain embodiments.

In one embodiment, the internal power supply 120 receives the current and/or voltage 114, and in response outputs a power-supply voltage and/or current 122 to the phase control block 130, the controlled switch blocks 140, 142, and 144, and the function block 170. For example, the phase control block 130 receives the power-supply voltage and/or current 122 and in response generates phase-control signals 132, 134, and 136. In another example, the phase control block 130 also generates the current and/or voltage 124. In another embodiment, the controlled switch block 140 receives the power-supply voltage and/or current 122 and the phase-control signal 132, the controlled switch block 142 receives the power-supply voltage and/or current 122 and the phase-control signal 134, and the controlled switch block 144 receives the power-supply voltage and/or current 122 and the phase-control signal 136.

According to one embodiment, the controlled switch block 140, in response to the phase-control signal 132, is closed (e.g., turned on) during a time duration and is open (e.g., turned off) during another time duration. For example, during the time duration when the controlled switch block 140 is closed, the controlled switch block 140 uses the power-supply voltage and/or current 122 to generate a voltage and/or current 141, and outputs the voltage and/or current 141 to the power supply 150. In another example, the power supply 150 receives power by receiving the voltage and/or current 141 and stores the received power while providing power (e.g., a voltage and/or current 151) to the function block 160. In yet another example, during the another time duration when the controlled switch block 140 is open, the power supply 150 does not receive any power from the controlled switch block 140, and the energy stored by the power supply 150 is trapped within the power supply 150 except that the power supply 150 still provides power (e.g., the voltage and/or current 151) to the function block 160. In yet another example, during the another time duration when the controlled switch block 140 is open, the power supply 150 does not receive any power from the controlled switch block 140, and the energy stored by the power supply 150 is blocked from leaking out through the controlled switch block 140 even though the power supply 150 still provides power (e.g., the voltage and/or current 151) to the function block 160.

According to another embodiment, the power supply 150 is phase locked (e.g., by the phase-control signal 132 through the controlled switch block 140) and self sustaining (e.g., by blocking energy already stored from leaking through the controlled switch block 140). For example, when the controlled switch block 140 is closed during a time duration as determined by the phase-control signal 132, the power supply 150 receives and stores additional energy while providing power to the function block 160. In another example, when the controlled switch block 140 is open during another time duration as determined by the phase-control signal 132, the power supply 150 does not store additional energy and the energy stored by the power supply 150 is blocked from leaking out through the controlled switch block 140, but the power supply 150 still provides power (e.g., the voltage and/or current 151) to the function block 160.

In one embodiment, the controlled switch block 142, in response to the phase-control signal 134, is closed (e.g., turned on) during a time duration and is open (e.g., turned off) during another time duration. For example, during the time duration when the controlled switch block 142 is closed, the controlled switch block 142 uses the power-supply voltage and/or current 122 to generate a voltage and/or current 143, and outputs the voltage and/or current 143 to the power supply 152. In another example, the power supply 152 receives power by receiving the voltage and/or current 143 and stores the received power while providing power (e.g., a voltage and/or current 153) to the function block 162. In yet another example, during the another time duration when the controlled switch block 142 is open, the power supply 152 does not receive any power from the controlled switch block 142, and the energy stored by the power supply 152 is trapped within the power supply 152 except that the power supply 152 still provides power (e.g., the voltage and/or current 153) to the function block 162. In yet another example, during the another time duration when the controlled switch block 142 is open, the power supply 152 does not receive any power from the controlled switch block 142, and the energy stored by the power supply 152 is blocked from leaking out through the controlled switch block 142 even though the power supply 152 still provides power (e.g., the voltage and/or current 153) to the function block 162.

In another embodiment, the power supply 152 is phase locked (e.g., by the phase-control signal 134 through the controlled switch block 142) and self sustaining (e.g., by blocking energy already stored from leaking through the controlled switch block 142). For example, when the controlled switch block 142 is closed during a time duration as determined by the phase-control signal 134, the power supply 152 receives and stores additional energy while providing power to the function block 162. In another example, when the controlled switch block 142 is open during another time duration as determined by the phase-control signal 134, the power supply 152 does not store additional energy and the energy stored by the power supply 152 is blocked from leaking out through the controlled switch block 142, but the power supply 152 still provides power (e.g., the voltage and/or current 153) to the function block 162.

According to one embodiment, the controlled switch block 144, in response to the phase-control signal 136, is closed (e.g., turned on) during a time duration and is open (e.g., turned off) during another time duration. For example, during the time duration when the controlled switch block 144 is closed, the controlled switch block 144 uses the power-supply voltage and/or current 122 to generate a voltage and/or current 145, and outputs the voltage and/or current 145 to the power supply 154. In another example, the power supply 154 receives power by receiving the voltage and/or current 145 and stores the received power while providing power (e.g., a voltage and/or current 155) to the function block 164. In yet another example, during the another time duration when the controlled switch block 144 is open, the power supply 154 does not receive any power from the controlled switch block 144, and the energy stored by the power supply 154 is trapped within the power supply 154 except that the power supply 154 still provides power (e.g., the voltage and/or current 155) to the function block 164. In yet another example, during the another time duration when the controlled switch block 144 is open, the power supply 154 does not receive any power from the controlled switch block 144, and the energy stored by the power supply 154 is blocked from leaking out through the controlled switch block 144 even though the power supply 154 still provides power (e.g., the voltage and/or current 155) to the function block 164.

According to another embodiment, the power supply 154 is phase locked (e.g., by the phase-control signal 136 through the controlled switch block 144) and self sustaining (e.g., by blocking energy already stored from leaking through the controlled switch block 144). For example, when the controlled switch block 144 is closed during a time duration as determined by the phase-control signal 136, the power supply 154 receives and stores additional energy while providing power to the function block 164. In another example, when the controlled switch block 144 is open during another time duration as determined by the phase-control signal 136, the power supply 154 does not store additional energy and the energy stored by the power supply 154 is blocked from leaking out through the controlled switch block 144, but the power supply 154 still provides power (e.g., the voltage and/or current 155) to the function block 164.

In one embodiment, the function block 160 receives the power (e.g., the voltage and/or current 151) from the power supply 150 and a signal (e.g., the current and/or voltage 114) from the terminal 110, performs a function on the signal (e.g., the current and/or voltage 114), and generates a current and/or voltage 161 based at least in part on the signal (e.g., the current and/or voltage 114) according to the function. For example, the current and/or voltage 161 is a part of the current and/or voltage 116.

In another embodiment, the function block 162 receives the power (e.g., the voltage and/or current 153) from the power supply 152 and a signal (e.g., the current and/or voltage 114) from the terminal 110, performs a function on the signal (e.g., the current and/or voltage 114), and generates a current and/or voltage 163 based at least in part on the signal (e.g., the current and/or voltage 114) according to the function. For example, the current and/or voltage 163 is a part of the current and/or voltage 116. In another example, the current and/or voltage 163 is different from the current and/or voltage 161.

In yet another embodiment, the function block 164 receives the power (e.g., the voltage and/or current 155) from the power supply 154 and a signal (e.g., the current and/or voltage 114) from the terminal 110, performs a function on the signal (e.g., the current and/or voltage 114), and generates a current and/or voltage 165 based at least in part on the signal (e.g., the current and/or voltage 114) according to the function. For example, the current and/or voltage 165 is a part of the current and/or voltage 116. In another example, the current and/or voltage 165 is different from the current and/or voltage 161 and from the current and/or voltage 163, and the current and/or voltage 163 is different from the current and/or voltage 161.

In yet another embodiment, the function block 170 receives the power (e.g., the power-supply voltage and/or current 122) from the internal power supply 120 and a signal (e.g., the current and/or voltage 114) from the terminal 110, performs a function on the signal (e.g., the current and/or voltage 114), and generates a current and/or voltage 175 based at least in part on the signal (e.g., the current and/or voltage 114) according to the function. For example, the function performed by the function block 160, the function performed by the function block 162, the function performed by the function block 164, and the function performed by the function block 170 are different. In yet another example, the current and/or voltage 116 is a combination of the current and/or voltage 161, the current and/or voltage 163, the current and/or voltage 165, and the current and/or voltage 175.

As shown in FIG. 1, the power supply 150 also generates a current and/or voltage 181, the power supply 152 also generates a current and/or voltage 183, and the power supply 154 also generates a current and/or voltage 185, according to certain embodiments. For example, the current and/or voltage 181, the current and/or voltage 183, and the current and/or voltage 185 are parts of the current and/or voltage 116. In yet another example, the current and/or voltage 116 is a combination of the current and/or voltage 161, the current and/or voltage 163, the current and/or voltage 165, the current and/or voltage 175, the current and/or voltage 181, the current and/or voltage 183, and the current and/or voltage 185.

In one embodiment, the switch blocks 140, 142, and 144 are controlled to be turned on or off according to their respective timing arrangements. For example, when the switch block 140, the switch block 142, and/or the switch block 144 are turned off, the energy stored by the power supply 150, the power supply 152, and/or the power supply 154 respectively are blocked from leaking out through the controlled switch block 140, the controlled switch block 142, and/or the controlled switch block 144 respectively, even though the power supply 150, the power supply 152, and/or the power supply 154 still provides power to the function block 160, the function block 162, and/or the function block 164 respectively. In another example, the energy trapped within the power supply 150, the power supply 152, and/or the power supply 154 respectively is used to provide power to different function blocks to maintain proper control, even if the power supply (e.g., the current and/or voltage 114 and/or the current and/or voltage 122) becomes very weak or even lost during a time period.

As discussed above and further emphasized here, FIG. 1 is merely an example, which should not unduly limit the scope of the claims. One of ordinary skill in the art would recognize many variations, alternatives, and modifications. In one embodiment, the IC chip 100 includes two or more function blocks 170. For example, each of the two or more function blocks 170 receives the power (e.g., the power-supply voltage and/or current 122) from the internal power supply 120 and a signal (e.g., the current and/or voltage 114) from the terminal 110, performs a function on the signal (e.g., the current and/or voltage 114), and generates a current and/or voltage based at least in part on the signal (e.g., the current and/or voltage 114) according to the function. In another example, the two or more functions performed by the two or more function blocks 170 respectively are different. In another embodiment, the IC chip 100 includes one or more additional components that are not explicitly shown in FIG. 1.

Figure 2:
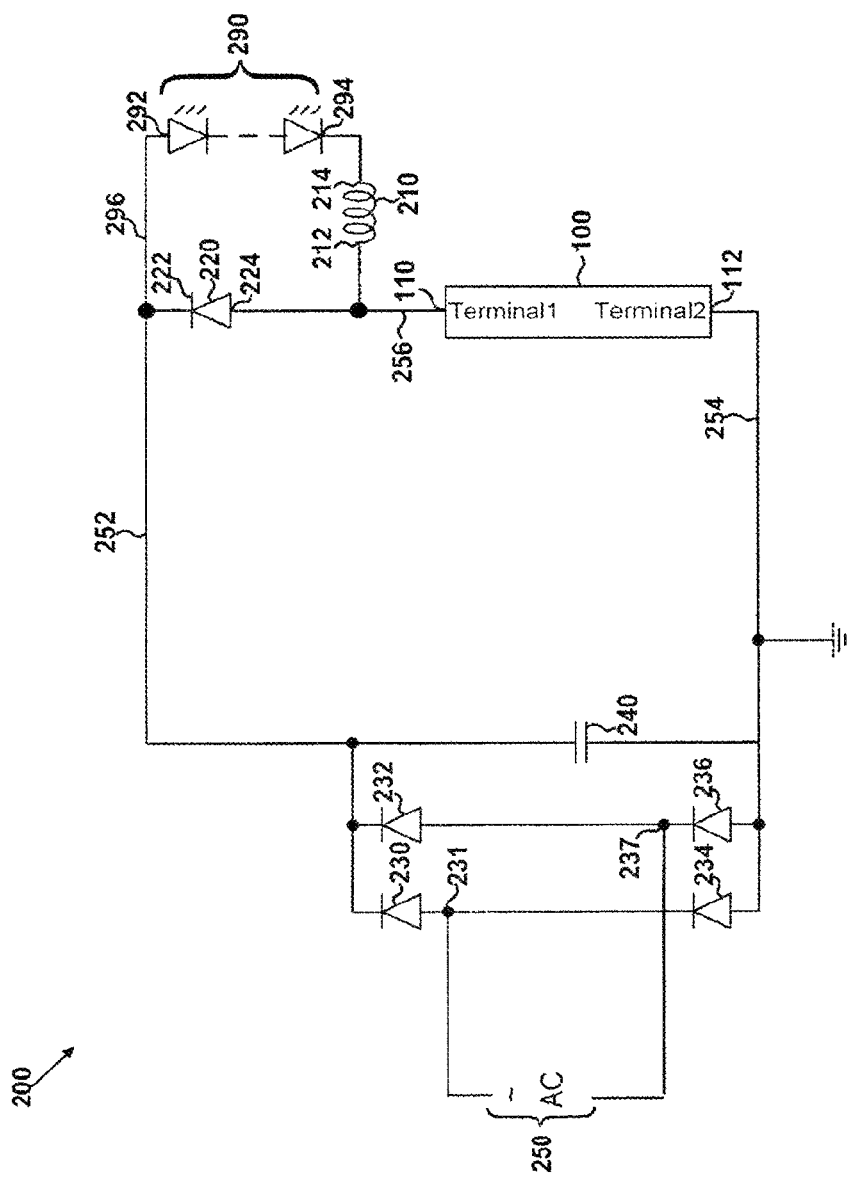
FIG. 2 is a simplified diagram showing an LED driver that includes the IC chip as shown in FIG. 1 according to an embodiment of the present invention.

FIG. 2 is a simplified diagram showing an LED driver that includes the IC chip 100 as shown in FIG. 1 according to an embodiment of the present invention. This diagram is merely an example, which should not unduly limit the scope of the claims. One of ordinary skill in the art would recognize many variations, alternatives, and modifications. For example, the LED driver 200 includes the IC chip 100, an inductive winding 210, a diode 220, diodes 230, 232, 234 and 236, and a capacitor 240. In another example, the LED driver 200 is configured to drive one or more light emitting diodes (LEDs) 290. In yet another example, the LED driver 200 operates in the switching-power-supply mode.

In one embodiment, a terminal 231 of the diode 230 and a terminal 237 of the diode 236 receive an AC voltage 250, and in response, the diodes 230, 232, 234 and 236 and the capacitor 240 generate a rectified voltage 252 (e.g., to provide rectified AC power). In another embodiment, the inductive winding 210 includes terminals 212 and 214, and the diode 220 includes terminals 222 and 224. For example, the rectified voltage 252 is received by the terminal 222 of the diode 220, and the terminal 224 of the diode 220 is connected to the terminal 212 of the inductive winding 210 and the terminal 110 of the IC chip 100. In another example, the one or more light emitting diodes (LEDs) 290 form a series, which includes terminals 292 and 294. In yet another example, the terminal 292 is connected to the terminal 222, and the terminal 294 is connected to the terminal 214.

In yet another embodiment, the terminal 110 of the IC chip 100 receives a voltage 256 from the terminal 224 and the terminal 212, and in response, the IC chip 100 generates a current 254. For example, the voltage 256 is received by the terminal 110 as the voltage 114, and the current 254 is outputted by the terminal 112 as the current 116. In another example, the terminal 112 of the IC chip 100 is biased to a predetermined voltage (e.g., the ground voltage).

In yet another embodiment, the IC chip 100 is biased between the voltage of the terminal 110 (e.g., the voltage 256) and the voltage of the terminal 112, and in response generates a current (e.g., the current 254) that flows into the IC chip 100 through the terminal 110 and flows out of the IC chip 100 through the terminal 112. For example, the IC chip 100 is a two-terminal device that has a current-voltage characteristic between the voltage $V_{chip}$ across the IC chip 100 (e.g., the voltage of the terminal 110 minus the voltage of the terminal 112) and the current $I_{chip}$ flowing through the IC chip 100 (e.g., the current 254). In another example, the current-voltage characteristic of the IC chip 100 is represented by an effective resistance $R_{chip}$ of the IC chip 100 as shown below:

$$R_{chip} = \frac{V_{chip}}{I_{chip}} \qquad \text{(Equation 1)}$$

wherein $R_{chip}$ represents the effective resistance of the IC chip 100. Additionally, $V_{chip}$ represents the voltage across the IC chip 100 (e.g., the voltage of the terminal 110 minus the voltage of the terminal 112), and $I_{chip}$ represents the current flowing through the IC chip 100 (e.g., the current 254).

In yet another embodiment, the current-voltage characteristic of the IC chip 100 changes with time. For example, the current-voltage characteristic of the IC chip 100 changes periodically with time. In another example, within each period, the current-voltage characteristic changes with time. In yet another embodiment, the effective resistance $R_{chip}$ of the IC chip 100 changes with time. For example, the effective resistance $R_{chip}$ of the IC chip 100 changes periodically with time. In another example, within each period, the effective resistance $R_{chip}$ of the IC chip 100 changes with time.

According to one embodiment, the voltage 256 is received by the IC chip 100, and in response, the IC chip 100 generates the current 254. For example, the current 254 changes with time. In another example, the current 254 changes periodically with time, and within each period, the current 254 changes with time. In yet another example, the current 254 changes with time so that a current 296 that flows through the series of one or more light emitting diodes 290 remains constant with respect to time.

According to another embodiment, the IC chip 100 of the LED driver 200 does not need to rely on an external capacitor to provide the power supply to the IC chip 100. According to another embodiment, the IC chip 100 of the LED driver 200 provides a two-functional-pin solution for the LED driver 200 that reduces the bill-of-materials (BOM) cost but still maintains effective constant-current control for the one or more light emitting diodes (LEDs) 290. For example, the IC chip 100 does not include any terminal (e.g., pin) other than the terminals (e.g., pins) 110 and 112. In another example, the IC chip 100 can reduce the size and/or cost of the overall system (e.g., the LED driver 200), and the IC chip 100 can be used in various consumer electronics.

According to yet another embodiment, the IC chip 100 is configured to keep the current 296 constant with respect to time even if the voltage 256 changes within a voltage range and the temperature of the IC chip 100 changes within a temperature range. For example, the IC chip 100 is further configured to periodically change the current 254 with respect to time and within each period, change the current 254 with respect to time, to keep the current 296 constant with respect to time even if the voltage 256 changes within the voltage range and the temperature of the IC chip 100 changes within the temperature range. In another example, the temperature range includes an upper temperature limit equal to 150° C. and a lower temperature limit equal to −40° C. In yet another example, the voltage range includes an upper voltage limit equal to 370 V and a lower voltage limit equal to 126 V.

According to yet another embodiment, the IC chip 100 is a controller for the LED driver 200. For example, the LED driver 200 is configured to receive the AC voltage 250 and generate the current 296 based on at least information associated with the AC voltage 250. In another example, the IC chip 100 is configured to generate the current 254, and/or change the current 254 with respect to time, to keep the LED driver 200 operating normally even if the AC voltage 250 changes. In yet another example, the IC chip 100 is further configured to periodically change the current 254 with respect to time and within each period, change the current 254 with respect to time, to keep the LED driver 200 operating normally even if the AC voltage 250 changes. In yet another example, the LED driver 200 is kept operating normally even if the AC voltage 250 changes, by keeping the current 296 constant in magnitude with respect to time even if the AC voltage 250 changes in magnitude.

Figure 3:
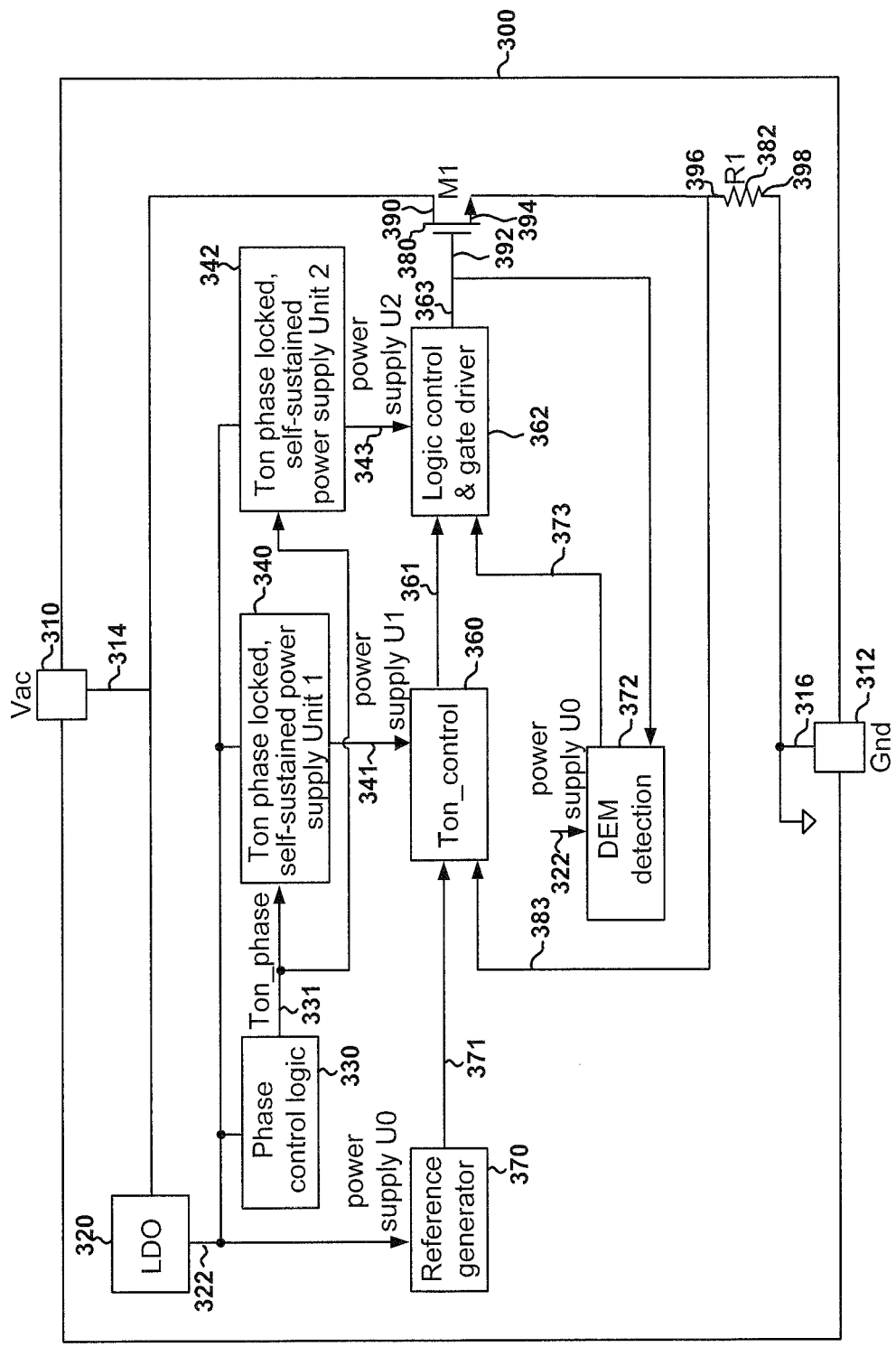
FIG. 3 is a simplified diagram showing an IC chip according to another embodiment of the present invention.

FIG. 3 is a simplified diagram showing an IC chip according to another embodiment of the present invention. This diagram is merely an example, which should not unduly limit the scope of the claims. One of ordinary skill in the art would recognize many variations, alternatives, and modifications. The IC chip 300 includes terminals 310 and 312, a low dropout regular 320, a phase controller 330 (e.g., a phase logic controller), a controlled switch and power supply 340, a controlled switch and power supply 342, an on-time controller 360, a logic-control and gate-drive component 362 (e.g., a driver), a reference-voltage generator 370, a demagnetization detector 372, a switch 380 (e.g., a transistor), and a resistor 382.

In one embodiment, the IC chip 300 is the IC chip 100. For example, the terminal 310 is the terminal 110, and the terminal 312 is the terminal 112. In another example, the low dropout regular 320 is the internal power supply 120, and the phase controller 330 is the phase control block 130. In yet another example, the controlled switch and power supply 340 is a combination of the controlled switch block 140 and the power supply 150, and the controlled switch and power supply 342 is a combination of the controlled switch block 142 and the power supply 152. In yet another example, the on-time controller 360 is the function block 160, and the logic-control and gate-drive component 362 is the function block 162. In yet another example, the reference-voltage generator 370 is the function block 170, and the demagnetization detector 372 is another function block 170. In another embodiment, the IC chip 300 is the IC chip 100 that is used in the LED driver 200 as shown in FIG. 2.

In one embodiment, the terminal 310 receives a voltage 314 (e.g., the current and/or voltage 114, or the voltage 256) from outside the IC chip 300, and the terminal 312 outputs a current 316 (e.g., the current and/or voltage 116, or the current 254) to outside the IC chip 300. For example, the current 316 is larger than or equal to zero in magnitude. In another example, the voltage 314 is received by the low dropout regular 320 and the switch 380. In another example, the switch 380 is a transistor (e.g., MOSFET). In another embodiment, the low dropout regular 320 receives the voltage 314, and in response outputs a power-supply voltage 322 to the phase controller 330, the controlled switch and power supply 340, the controlled switch and power supply 342, the reference-voltage generator 370, and the demagnetization detector 372.

According to one embodiment, the reference-voltage generator 370 outputs a reference voltage and/or current 371 to the on-time controller 360. According to another embodiment, the demagnetization detector 372 outputs a demagnetization signal 373 to the logic-control and gate-drive component 362. For example, the demagnetization signal 373 indicates the beginning and the end of each demagnetization period. In another example, the demagnetization period is related to a demagnetization process of the inductive winding 210.

According to yet another embodiment, the phase controller 330 receives the power-supply voltage 322, and outputs a phase-control signal 331 to the controlled switch and power supply 340 and the controlled switch and power supply 342. For example, the controlled switch and power supply 340 includes a switch, and the controlled switch and power supply 342 also includes a switch. In another example, the phase-control signal 331 indicates the beginning and the end of each turn-on time period and the beginning and the end of each turn-off time period. In yet another example, the phase-control signal 331 is at a logic level (e.g., a logic high level) during each turn-on period (e.g., from the beginning to the end of each turn-on time period), and is at another logic level (e.g., a logic low level) during each turn-off time period (e.g., from the beginning to the end of each turn-off time period).

In one embodiment, during the turn-on time period as indicated by the phase-control signal 331, the switch of the controlled switch and power supply 340 is closed (e.g., turned on), and during the turn-off time period as indicated by the phase-control signal 331, the switch of the controlled switch and power supply 340 is open (e.g., turned off). For example, if the switch of the controlled switch and power supply 340 is closed, the controlled switch and power supply 340 receives power provided by the power-supply voltage 322 and stores the received power while providing power (e.g., a power-supply voltage 341) to the on-time controller 360. In another example, if the switch of the controlled switch and power supply 340 is open, the controlled switch and power supply 340 does not store any additional power provided by the power-supply voltage 322, and the energy that has already been stored by the controlled switch and power supply 340 is trapped within the controlled switch and power supply 340 except that the controlled switch and power supply 340 still provides power (e.g., the power-supply voltage 341) to the on-time controller 360. In yet another example, if the switch of the controlled switch and power supply 340 is open, the controlled switch and power supply 340 does not store any additional power provided by the power-supply voltage 322, and the energy that has already been stored by the controlled switch and power supply 340 is blocked from leaking out through the switch of the controlled switch and power supply 340 even though the controlled switch and power supply 340 still provides power (e.g., the power-supply voltage 341) to the on-time controller 360.

In another embodiment, during the turn-on time period as indicated by the phase-control signal 331, the switch of the controlled switch and power supply 342 is closed (e.g., turned on), and during the turn-off time period as indicated by the phase-control signal 331, the switch of the controlled switch and power supply 342 is open (e.g., turned off). For example, if the switch of the controlled switch and power supply 342 is closed, the controlled switch and power supply 342 receives power provided by the power-supply voltage 322 and stores the received power while providing power (e.g., a power-supply voltage 343) to the logic-control and gate-drive component 362. In another example, if the switch of the controlled switch and power supply 342 is open, the controlled switch and power supply 342 does not store any additional power provided by the power-supply voltage 322, and the energy that has already been stored by the controlled switch and power supply 342 is trapped within the controlled switch and power supply 342 except that the controlled switch and power supply 342 still provides power (e.g., the power-supply voltage 343) to the logic-control and gate-drive component 362. In yet another example, if the switch of the controlled switch and power supply 342 is open, the controlled switch and power supply 342 does not store any additional power provided by the power-supply voltage 322, and the energy that has already been stored by the controlled switch and power supply 342 is blocked from leaking out through the switch of the controlled switch and power supply 342 even though the controlled switch and power supply 342 still provides power (e.g., the power-supply voltage 343) to the logic-control and gate-drive component 362.

According to one embodiment, the on-time controller 360 receives the reference voltage and/or current 371 and a current-sensing voltage 383, and in response generates a control signal 361. For example, the on-time controller 360 compares the current-sensing voltage 383 with a predetermined voltage limit that corresponds to a predetermined current limit. In another example, the control signal 361 indicates whether the current 316 has reached or exceeded the predetermined current limit. In another example, the control signal 361 is received by the logic-control and gate-drive component 362, which also receives the demagnetization signal 373 and the power-supply voltage 343. In another example, the logic-control and gate-drive component 362 generates a drive signal 363, which is received by the switch 380 and the demagnetization detector 372.

According to another embodiment, the demagnetization detector 372 receives the drive signal 363 and the power-supply voltage 322 and generates the demagnetization signal 373 based on at least in part on the drive signal 363. For example, the drive signal 363 is coupled to the voltage 314 through the parasitic capacitor between the gate terminal 392 of the transistor 380 and the drain terminal 390 of the transistor 380 (e.g., $C_{gd}$). In another example, the demagnetization signal 373 indicates the beginning and the end of each demagnetization period. In another example, the demagnetization period is related to the demagnetization process of the inductive winding 210.

In one embodiment, the switch 380 receives the drive signal 363, and is closed or opened by the drive signal 363. For example, the drive signal 363 is a pulse-width-modulation (PWM) signal, which changes between a logic low level and a logic high level. In another example, the pulse-width-modulation (PWM) signal remains at the logic high level during a pulse width. In another embodiment, if the drive signal 363 is at the logic high level, the switch 380 is turned on and thus closed, and if the drive signal 363 is at the logic low level, the switch 380 is turned off and thus opened.

In yet another embodiment, the switch 380 (e.g., a transistor) includes terminals 390, 392, and 394, and the resistor 382 includes terminals 396 and 398. For example, the terminal 390 of the transistor 380 is connected to the terminal 310 of the IC chip 300, and the terminal 392 of the transistor 380 is configured to receive the drive signal 363. In another example, the terminal 394 of the transistor 380 is connected to the terminal 396 of the resistor 382, and the terminal 398 of the resistor 382 is connected to the terminal 312 of the IC chip 300.

As shown in FIG. 3, the transistor 380 and the resistor 382 are biased between the voltage of the terminal 310 and the voltage of the terminal 312 according to certain embodiments. For example, if the transistor 380 is turned on, the current 316 flows into the IC chip 300 at the terminal 310, through the transistor 380 and the resistor 382, and out of the IC chip 300 at the terminal 312. In another example, the current-sensing voltage 383 represents the magnitude of the current 316.

According to one embodiment, the on-time controller 360 receives the power-supply voltage 341, the reference voltage and/or current 371, and the current-sensing voltage 383, and generates the control signal 361, and the demagnetization detector 372 receives the drive signal 363 and the power-supply voltage 322 and generates the demagnetization signal 373. For example, the control signal 361 indicates whether the current 316 has reached or exceeded the predetermined current limit, and the demagnetization signal 373 indicates the beginning and the end of each demagnetization period (e.g., related to the demagnetization process of the inductive winding 210). In another example, both the control signal 361 and the demagnetization signal 373 are received by the logic-control and gate-drive component 362.

According to another embodiment, the logic-control and gate-drive component 362 uses the control signal 361 and the demagnetization signal 373 to determine the pulse width of the drive signal 363. For example, if the demagnetization signal 373 indicates the end of a demagnetization period (e.g., related to the demagnetization process of the inductive winding 210), the pulse width of the drive signal 363 starts and the switch 380 changes from being turned off to being turned on so that the current 316 starts to increase from zero in magnitude. In another example, if the control signal 361 indicates the current 316 has reached or exceeded the predetermined current limit, the pulse width of the drive signal 363 ends and the switch 380 changes from being turned on to being turned off so that the current 316 drops to zero in magnitude.

As discussed above and further emphasized here, FIG. 3 is merely an example, which should not unduly limit the scope of the claims. One of ordinary skill in the art would recognize many variations, alternatives, and modifications. For example, the IC chip 300 also includes a bandgap circuit (e.g., a temperature-independent voltage-reference circuit). In another example, the IC chip 300 also includes a reference-current generator, in replacement of or in addition to the reference-voltage generator 370.

According to certain embodiments, the IC chip 100 (e.g., the IC chip 300) is an integrated circuit. For example, the IC chip 100 (e.g., the IC chip 300) includes two or more semiconductor devices that are integrated, and has a control architecture with multiple functional blocks. In another example, the IC chip 100 (e.g., the IC chip 300) includes no more than two terminals (e.g., the terminals 110 and 112). In yet another example, the IC chip 100 can be used in various electronic systems (e.g., the LED driver 200).

According to some embodiments, the IC chip 100 (e.g., the IC chip 300) is an integrated circuit that includes no more than two terminals (e.g., pins). For example, the integrated circuit of the IC chip 100 includes two or more active semiconductor devices (e.g., one or more diodes and/or one or more transistors) that are integrated. In another example, the IC chip 100 (e.g., the IC chip 300) generates an internal signal (e.g., the drive signal 363), which is a pulse-width-modulation (PWM) signal. In yet another example, the IC chip 100 (e.g., the IC chip 300) has a current-voltage characteristic between the voltage across the IC chip 100 and the current flowing through the IC chip 100. In yet another example, the current-voltage characteristic of the IC chip 100 is periodic with respect to time, and within each period, the current-voltage characteristic (e.g., the current-voltage analog behavior) changes with time.

According to certain embodiments, the IC chip 100 (e.g., the IC chip 300) includes one or more mixed-signal IC architectures, circuits and/or components. For example, the phase controller 330 and the logic-control and gate-drive component 362 each are a digital circuit. In another example, the low dropout regular 320, the controlled switch and power supply 340, the controlled switch and power supply 342, and the reference-voltage generator 370 each are an analog circuit. In yet another example, the on-time controller 360 and the demagnetization detector 372 each include an analog circuit and a digital circuit.

According to some embodiments, the IC chip 100 (e.g., the IC chip 300) is an integrated circuit that includes no more than two terminals (e.g., pins) and that also includes one or more controlled switch blocks (e.g., the controlled switch blocks 140, 142, and/or 144) and one or more power supplies (e.g., the power supplies 150, 152, and/or 154). For example, the IC chip 100 (e.g., the IC chip 300) generates an internal signal (e.g., the drive signal 363), which is a pulse-width-modulation (PWM) signal. In another example, the one or more controlled switch blocks (e.g., the controlled switch blocks 140, 142, and/or 144) receive one or more corresponding phase-control signals (e.g., the phase-control signals 132, 134, and/or 136) respectively, and are opened or closed by the one or more corresponding phase-control signals (e.g., the phase-control signals 132, 134, and/or 136) respectively. In yet another example, the one or more controlled switch blocks (e.g., the controlled switch blocks 140, 142, and/or 144) are opened or closed according to their respectively timing arrangements (e.g., as determined by the one or more corresponding phase-control signals respectively).

In one embodiment, if a controlled switch block (e.g., the controlled switch block 140, 142, or 144) is closed (e.g., turned on) during a time duration, a corresponding power supply that is connected to the controlled switch block (e.g., the power supply 150, 152, or 154) receives power through the controlled switch block and stores the received power while providing power to a corresponding function block that is connected to the power supply (e.g., the function block 160, 162, or 164). In another embodiment, if the controlled switch block (e.g., the controlled switch block 140, 142, or 144) is open (e.g., turned off) during another time duration, the corresponding power supply that is connected to the controlled switch block (e.g., the power supply 150, 152, or 154) does not receive any power from the controlled switch block, and the energy stored by the corresponding power supply is trapped within this power supply, except that this power supply still provides power to the corresponding function block that is connected to this power supply (e.g., the function block 160, 162, or 164). In yet another embodiment, if the controlled switch block (e.g., the controlled switch block 140, 142, or 144) is open (e.g., turned off) during another time duration, the corresponding power supply that is connected to the controlled switch block (e.g., the power supply 150, 152, or 154) does not receive any power from the controlled switch block, and the energy stored by the corresponding power supply is blocked from leaking out through the controlled switch block even though this power supply still provides power to the corresponding function block that is connected to this power supply (e.g., the function block 160, 162, or 164).

According to certain embodiments, the IC chip 100 (e.g., the IC chip 300) is an integrated circuit that includes no more than two terminals (e.g., pins). In one embodiment, the two-terminal IC chip 100 (e.g., the two-terminal IC chip 300) is a controller for an electronic system (e.g., an electronic system that includes the LED driver 200 and the one or more LEDs 290). In another embodiment, the two-terminal controller 100 (e.g., the two-terminal controller 300) enables an electronic system to perform normal and/or stable operations even if the external conditions of the electronic system changes. For example, an electronic system includes the LED driver 200 and the one or more LEDs 290, and the two-terminal controller 100 (e.g., the two-terminal controller 300) keeps the current 296 that flows through the one or more light emitting diodes 290 constant with respect to time, even if the AC voltage 250 changes in amplitude (e.g., the peak magnitude of the AC voltage 250 changes from one voltage value to another voltage value).

According to some embodiments, the IC chip 100 (e.g., the IC chip 300) is a two-terminal controller that can use a same terminal (e.g., the terminal 110 and/or the terminal 310) as an input terminal during a time duration and as an output terminal during another time duration. For example, the two-terminal controller 100 (e.g., the two-terminal controller 300) implements a signal processing mechanism (e.g., a signal processing algorithm), and the signal processing mechanism is used to determine the relationship between the time duration and the another time duration. In another example, during a pulse width of the pulse-width-modulation (PWM) signal 363, the two-terminal controller 300 uses the terminal 310 as an output terminal to allow the current 316 that is larger than zero in magnitude to flow into the controller 300 at the terminal 310 and flow out of the controller 300 at the terminal 312. In yet another example, during a pulse width of the pulse-width-modulation (PWM) signal 363, the two-terminal controller 100 (e.g., the two-terminal controller 300) outputs the current 316 that is larger than zero in magnitude as the drive current to the one or more light emitting diodes (LEDs) 290. In yet another example, during a demagnetization period (e.g., related to the demagnetization process of the inductive winding 210) that is outside the pulse width of the pulse-width-modulation (PWM) signal 363, the two-terminal controller 300 uses the terminal 310 as an input terminal to receive the voltage 314 and process (e.g., detect and/or sample) the received voltage 314 to determine the end of the demagnetization period, which corresponds to the beginning of the next pulse width. In yet another example, the voltage 314 is coupled to the drive signal 363 through the parasitic capacitor between the gate terminal 392 of the transistor 380 and the drain terminal 390 of the transistor 380 (e.g., $C_{gd}$).

According to some embodiments, the IC chip 100 (e.g., the IC chip 300) is a two-terminal controller that can adaptively change its output (e.g., the current and/or voltage 116, the current 254, and/or the current 316) in response to the change of its input (e.g., the current and/or voltage 114, the voltage 256, and/or the voltage 314), so that an electronic system (e.g., an electronic system including the LED driver 200, the one or more LEDs 290, and the two-terminal controller 100) can perform normal and/or stable operations (e.g., keep the current 296 that flows through the one or more light emitting diodes 290 constant with respect to time). For example, in response to the change in amplitude of its input (e.g., the change in peak magnitude of the current and/or voltage 114, the voltage 256, and/or the voltage 314), the IC chip 100 (e.g., the IC chip 300) changes its output (e.g., the current and/or voltage 116, the current 254, and/or the current 316) through a control mechanism (e.g., by changing the pulse width and/or the duty cycle of the drive signal 363) so that the current 296 that flows through the one or more light emitting diodes 290 remains constant with respect to time.

In another example, if the AC voltage 250 changes in amplitude (e.g., the peak magnitude of the AC voltage 250 changes from one voltage value to another voltage value), the amplitude of the current and/or voltage 114, the voltage 256, and/or the voltage 314 (e.g., the peak magnitude of the current and/or voltage 114, the voltage 256, and/or the voltage 314) also changes. In yet another example, if the amplitude of the current and/or voltage 114, the voltage 256, and/or the voltage 314 becomes smaller, the pulse width and/or the duty cycle of the drive signal 363 becomes larger so that the current 296 that flows through the one or more light emitting diodes 290 remains constant with respect to time.

In yet another example, the two-terminal controller 100 (e.g., the two terminal controller 300) adaptively changes its output (e.g., the current and/or voltage 116, the current 254, and/or the current 316) in response to the change of its input (e.g., the current and/or voltage 114, the voltage 256, and/or the voltage 314) by changing a relationship (e.g., the current-voltage characteristic of the IC chip 100 as shown in Equation 1) between the controller input and the controller output, so that the current 296 that flows through the one or more light emitting diodes 290 remains constant with respect to time. In another example, without such change in the relationship, the relationship between the controller input and the controller output varies with time periodically; in contrast, with such change in the relationship, the relationship between the controller input and the controller output varies with time but not periodically.

According to another embodiment, a two-terminal IC chip (e.g., the IC chip 100 and/or the IC chip 300) includes a first chip terminal (e.g., the terminal 110 and/or the terminal 310) and a second chip terminal (e.g., the terminal 112 and/or the terminal 312). A first terminal voltage (e.g., the voltage 256) is a voltage of the first chip terminal, a second terminal voltage is a voltage of the second chip terminal, and a chip voltage (e.g., the voltage $V_{chip}$ across the IC chip 100) is equal to a difference between the first terminal voltage and the second terminal voltage. The chip is configured to allow a chip current (e.g., the current 254) to flow into the chip at the first chip terminal and out of the chip at the second chip terminal, or to flow into the chip at the second chip terminal and out of the chip at the first chip terminal. The chip current is larger than or equal to zero in magnitude. The chip is further configured to change a relationship (e.g., the current-voltage characteristic of the IC chip 100 as shown in Equation 1) between the chip voltage and the chip current with respect to time. The chip (e.g., the IC chip 100 and/or the IC chip 300) is an integrated circuit, and the chip does not include any additional chip terminal other than the first chip terminal (e.g., the terminal 110 and/or the terminal 310) and the second chip terminal (e.g., the terminal 112 and/or the terminal 312). For example, the two-terminal IC chip is implemented according to at least FIG. 1, FIG. 2, and/or FIG. 3.

In another example, the two-terminal IC chip is further configured to periodically change the relationship (e.g., the current-voltage characteristic of the IC chip 100 as shown in Equation 1) between the chip voltage and the chip current with respect to time, and within each period, change the relationship between the chip voltage and the chip current with respect to time. In yet another example, the two-terminal IC chip also includes a switch (e.g., the switch 380) and a resistor (e.g., the resistor 382) coupled to the switch. The switch is configured to receive a drive signal (e.g., the drive signal 363), and be opened or closed in response to the drive signal. The chip is further configured to, in response to the switch being opened, change the chip current (e.g., the current 254) from being larger than zero to being equal to zero in magnitude, and in response to the switch being closed, change the chip current (e.g., the current 254) from being equal to zero to being larger than zero in magnitude.

In yet another example, the chip is further configured to, in response to the switch being closed, allow the chip current to flow through the switch and the resistor. The chip current being larger than zero in magnitude. In yet another example, the drive signal (e.g., the drive signal 363) is a pulse-width-modulation signal corresponding to a pulse width for each modulation period. In yet another example, the two-terminal IC chip also includes a driver (e.g., the driver 362) configured to receive a first signal (e.g., the demagnetization signal 373) and a second signal (e.g., the control signal 361) and generate the drive signal (e.g., the drive signal 363). The driver is further configured to, in response to the first signal (e.g., the demagnetization signal 373) indicating an end of a demagnetization period, change the drive signal to start the pulse width, and in response to the second signal (e.g., the control signal 361) indicating the chip current (e.g., the current 254) has reached or exceeded a predetermined current limit, change the drive signal to end the pulse width. In yet another example, the driver is further configured to, in response to the first signal indicating the end of the demagnetization period, change the drive signal to close the switch and increase the chip current (e.g., the current 254) from zero in magnitude, and in response to the second signal indicating the chip current has reached or exceeded the predetermined current limit, change the drive signal to open the switch and decrease the chip current to zero in magnitude.

In yet another example, the first chip terminal (e.g., the terminal 110 and/or the terminal 310) is coupled to a first winding terminal (e.g., the terminal 212) of an inductive winding (e.g., the inductive winding 210) and a first diode terminal (e.g., the terminal 224) of a diode (e.g., the diode 220). The inductive winding further includes a second winding terminal (e.g., the terminal 214), and the diode further includes a second diode terminal (e.g., the terminal 222). A series of one or more light emitting diodes (e.g., the one or more LEDs 290) is coupled to the second winding terminal and the second diode terminal. The second winding terminal and the second diode terminal are configured to receive a rectified AC voltage (e.g., the rectified voltage 252). In yet another example, the two-terminal IC chip is further configured to receive the first terminal voltage (e.g., the voltage 256) at the first chip terminal (e.g., the terminal 110 and/or the terminal 310) and generate the chip current (e.g., the current 254) based at least in part on the first terminal voltage. In yet another example, the chip current (e.g., the current 254) is configured to flow between the first chip terminal and the second chip terminal to affect a light-emitting-diode current (e.g., the current 296) flowing through the series of the one or more light emitting diodes (e.g., the one or more LEDs 290). In yet another example, the two-terminal IC chip is further configured to change the chip current (e.g., the current 254) with respect to time to keep the light-emitting-diode current (e.g., the current 296) constant with respect to time. In yet another example, the two-terminal IC chip (e.g., the IC chip 100 and/or the IC chip 300) is further configured to periodically change the chip current (e.g., the current 254) with respect to time and within each period, change the chip current (e.g., the current 254) with respect to time, to keep the light-emitting-diode current (e.g., the current 296) constant with respect to time.

In yet another example, the two-terminal IC chip (e.g., the IC chip 100 and/or the IC chip 300) also includes a controlled switch (e.g., the controlled switch 140, the controlled switch 142, and/or the controlled switch 144) configured to receive a control signal (e.g., the phase-control signal 132, the phase-control signal 134, the phase-control signal 136, and/or the phase-control signal 331), and a power supply (e.g., the power supply 150, the power supply 152, and/or the power supply 154) coupled to the controlled switch. The controlled switch is further configured to be closed during a first time duration in response to the control signal, and to be open during a second time duration in response to the control signal. The power supply is configured to, in response to the controlled switch being closed, receive a first power (e.g., the voltage and/or current 141, the voltage and/or current 143, and/or the voltage and/or current 145) through the controlled switch and store the received first power during the first time duration, and in response to the controlled switch being open, not store any additional power and not allow stored power to leak out through the controlled switch during the second time duration. The power supply (e.g., the power supply 150, the power supply 152, and/or the power supply 154) is further configured to output a second power (e.g., the voltage and/or current 151, the voltage and/or current 153, the voltage and/or current 155, the power-supply voltage 341, and/or the power-supply voltage 343) during the first time duration and the second time duration. In yet another example, the chip voltage (e.g., the voltage $V_{chip}$ across the IC chip 100) is equal to the first terminal voltage minus the second terminal voltage.

According to yet another embodiment, a two-terminal IC chip (e.g., the IC chip 100 and/or the IC chip 300) includes a first chip terminal (e.g., the terminal 110 and/or the terminal 310), a second chip terminal (e.g., the terminal 112 and/or the terminal 312), and a first switch (e.g., the switch 380). The chip is configured to allow a chip current (e.g., the current 254) to flow into the chip at the first chip terminal and out of the chip at the second chip terminal, or to flow into the chip at the second chip terminal and out of the chip at the first chip terminal. The chip current is larger than or equal to zero in magnitude. The first switch is configured to receive a drive signal (e.g., the drive signal 363) and be opened or closed in response to the drive signal. The chip is further configured to, in response to the first switch being opened, change the chip current from being larger than zero to being equal to zero in magnitude, and in response to the first switch being closed, change the chip current from being equal to zero to being larger than zero in magnitude. The chip is an integrated circuit, and the chip does not include any additional chip terminal other than the first chip terminal (e.g., the terminal 110 and/or the terminal 310) and the second chip terminal (e.g., the terminal 112 and/or the terminal 312). For example, the two-terminal IC chip is implemented according to at least FIG. 1, FIG. 2, and/or FIG. 3.

In another example, the drive signal (e.g., the drive signal 363) is a pulse-width-modulation signal corresponding to a pulse width for each modulation period. In yet another example, the two-terminal IC chip also includes a driver (e.g., the driver 362) configured to receive a first signal (e.g., the demagnetization signal 373) and a second signal (e.g., the control signal 361) and generate the drive signal (e.g., the drive signal 363). The driver is further configured to, in response to the first signal (e.g., the demagnetization signal 373) indicating an end of a demagnetization period, change the drive signal to start the pulse width, and in response to the second signal (e.g., the control signal 361) indicating the chip current (e.g., the current 254) has reached or exceeded a predetermined current limit, change the drive signal to end the pulse width. In yet another example, the driver is further configured to, in response to the first signal indicating the end of the demagnetization period, change the drive signal to close the first switch and increase the chip current (e.g., the current 254) from zero in magnitude, and in response to the second signal indicating the chip current has reached or exceeded the predetermined current limit, change the drive signal to open the first switch and decrease the chip current to zero in magnitude.

In yet another example, the first chip terminal (e.g., the terminal 110 and/or the terminal 310) is coupled to a first winding terminal (e.g., the terminal 212) of an inductive winding (e.g., the inductive winding 210) and a first diode terminal (e.g., the terminal 224) of a diode (e.g., the diode 220). The inductive winding further includes a second winding terminal (e.g., the terminal 214), and the diode further includes a second diode terminal (e.g., the terminal 222). A series of one or more light emitting diodes (e.g., the one or more LEDs 290) is coupled to the second winding terminal and the second diode terminal. The second winding terminal and the second diode terminal are configured to receive a rectified AC voltage (e.g., the rectified voltage 252).

In yet another example, the two-terminal IC chip is further configured to receive an input voltage (e.g., the voltage 256) at the first chip terminal (e.g., the terminal 110 and/or the terminal 310) and generate the chip current (e.g., the current 254) based at least in part on the received input voltage. In yet another example, the chip current (e.g., the current 254) is configured to flow between the first chip terminal and the second chip terminal to affect a light-emitting-diode current (e.g., the current 296) flowing through the series of the one or more light emitting diodes (e.g., the one or more LEDs 290). In yet another example, the two-terminal IC chip is further configured to change the chip current (e.g., the current 254) with respect to time to keep the light-emitting-diode current (e.g., the current 296) constant with respect to time. In yet another example, the two-terminal IC chip (e.g., the IC chip 100 and/or the IC chip 300) is further configured to periodically change the chip current (e.g., the current 254) with respect to time and within each period, change the chip current (e.g., the current 254) with respect to time, to keep the light-emitting-diode current (e.g., the current 296) constant with respect to time.

In yet another example, the two-terminal IC chip (e.g., the IC chip 100 and/or the IC chip 300) also includes a second switch (e.g., the switch 140, the switch 142, and/or the switch 144) configured to receive a control signal (e.g., the phase-control signal 132, the phase-control signal 134, the phase-control signal 136, and/or the phase-control signal 331), and a power supply (e.g., the power supply 150, the power supply 152, and/or the power supply 154) coupled to the second switch. The second switch is further configured to be closed during a first time duration in response to the control signal, and to be open during a second time duration in response to the control signal. The power supply is configured to, in response to the second switch being closed, receive a first power (e.g., the voltage and/or current 141, the voltage and/or current 143, and/or the voltage and/or current 145) through the second switch and store the received first power during the first time duration, and in response to the second switch being open, not store any additional power and not allow stored power to leak out through the second switch during the second time duration. The power supply (e.g., the power supply 150, the power supply 152, and/or the power supply 154) is further configured to output a second power (e.g., the voltage and/or current 151, the voltage and/or current 153, the voltage and/or current 155, the power-supply voltage 341, and/or the power-supply voltage 343) during the first time duration and the second time duration.

According to yet another embodiment, a two-terminal IC chip (e.g., the IC chip 100 and/or the IC chip 300) includes a first chip terminal (e.g., the terminal 110 and/or the terminal 310), a second chip terminal (e.g., the terminal 112 and/or the terminal 312), a first switch (e.g., the switch 140, the switch 142, and/or the switch 144) configured to receive a first signal (e.g., the phase-control signal 132, the phase-control signal 134, the phase-control signal 136, and/or the phase-control signal 331), and a first power supply (e.g., the power supply 150, the power supply 152, and/or the power supply 154) coupled to the first switch. The first switch is configured to be closed during a first time duration in response to the first signal, and to be open during a second time duration in response to the first signal. The first power supply (e.g., the power supply 150, the power supply 152, and/or the power supply 154) is configured to, in response to the first switch (e.g., the switch 140, the switch 142, and/or the switch 144) being closed, receive a first power (e.g., the voltage and/or current 141, the voltage and/or current 143, and/or the voltage and/or current 145) through the first switch and store the received first power during the first time duration, and in response to the first switch being open, not store any additional power and not allow the stored power to leak out through the first switch during the second time duration. The first power supply (e.g., the power supply 150, the power supply 152, and/or the power supply 154) is further configured to output a second power (e.g., the voltage and/or current 151, the voltage and/or current 153, the voltage and/or current 155, the power-supply voltage 341, and/or the power-supply voltage 343) during the first time duration and the second time duration. A first terminal voltage (e.g., the voltage 256) is a voltage of the first chip terminal (e.g., the terminal 110 and/or the terminal 310), a second terminal voltage is a voltage of the second chip terminal (e.g., the terminal 112 and/or the terminal 312), and a chip voltage (e.g., the voltage $V_{chip}$ across the IC chip 100) is equal to a difference between the first terminal voltage and the second terminal voltage. The chip is configured to allow a chip current (e.g., the current 254) to flow into the chip at the first chip terminal and out of the chip at the second chip terminal, or to flow into the chip at the second chip terminal and out of the chip at the first chip terminal. The chip current is larger than or equal to zero in magnitude. The chip (e.g., the IC chip 100 and/or the IC chip 300) is further configured to, based at least in part on the second power (e.g., the voltage and/or current 151, the voltage and/or current 153, the voltage and/or current 155, the power-supply voltage 341, and/or the power-supply voltage 343), generate at least one selected from a group consisting of the chip voltage (e.g., the voltage $V_{chip}$ across the IC chip 100) and the chip current (e.g., the current 254). The chip (e.g., the IC chip 100 and/or the IC chip 300) is an integrated circuit, and the chip does not include any additional chip terminal other than the first chip terminal (e.g., the terminal 110 and/or the terminal 310) and the second chip terminal (e.g., the terminal 112 and/or the terminal 312). For example, the two-terminal IC chip is implemented according to at least FIG. 1, FIG. 2, and/or FIG. 3.

In another example, the two-terminal IC chip also includes a driver (e.g., the driver 362) configured to receive the second power (e.g., the power-supply voltage 343) and generate a drive signal (e.g., the drive signal 363), and a second switch (e.g., the switch 380) configured to receive the drive signal and be opened or closed in response to the drive signal. The chip is further configured to, in response to the switch being opened, change the chip current (e.g., the current 254) from being larger than zero to being equal to zero in magnitude, and in response to the switch being closed, change the chip current (e.g., the current 254) from being equal to zero to being larger than zero in magnitude.

In yet another example, the drive signal (e.g., the drive signal 363) is a pulse-width-modulation signal corresponding to a pulse width for each modulation period. In yet another example, the two-terminal IC chip further includes a controller (e.g., the phase controller 130 and/or the phase controller 330) configured to generate the first signal (e.g., the phase-control signal 132, the phase-control signal 134, the phase-control signal 136, and/or the phase-control signal 331). The first signal (e.g., the phase-control signal 132, the phase-control signal 134, the phase-control signal 136, and/or the phase-control signal 331) is at a first logic level during the first time duration, and the first signal is at a second logic level during the second time duration. The second logic level is different from the first logic level.

In yet another example, the two-terminal IC chip (e.g., the IC chip 100 and/or the IC chip 300) also includes a second power supply (e.g., the internal power supply 120 and/or the low dropout regular 320). The second power supply is configured to receive a third power (e.g., the current and/or voltage 114, the voltage 256, and/or the voltage 314) from the first chip terminal (e.g., the terminal 110 and/or the terminal 310), generate a fourth power (e.g., the power-supply voltage and/or current 122 and/or the power-supply voltage 322) based at least in part on the third power, and output the fourth power to the controller (e.g., the phase controller 130 and/or the phase controller 330) and the first switch (e.g., the switch 140, the switch 142, and/or the switch 144). In yet another example, the first switch (e.g., the switch 140, the switch 142, and/or the switch 144) is further configured to, in response to the first switch being closed, output the first power (e.g., the voltage and/or current 141, the voltage and/or current 143, and/or the voltage and/or current 145) based at least in part on the fourth power (e.g., the power-supply voltage and/or current 122 and/or the power-supply voltage 322).

In yet another example, the first chip terminal (e.g., the terminal 110 and/or the terminal 310) is coupled to a first winding terminal (e.g., the terminal 212) of an inductive winding (e.g., the inductive winding 210) and a first diode terminal (e.g., the terminal 224) of a diode (e.g., the diode 220). The inductive winding further includes a second winding terminal (e.g., the terminal 214), and the diode further includes a second diode terminal (e.g., the terminal 222). A series of one or more light emitting diodes (e.g., the one or more LEDs 290) is coupled to the second winding terminal and the second diode terminal. The second winding terminal and the second diode terminal are configured to receive a rectified AC voltage (e.g., the rectified voltage 252). In yet another example, the chip voltage (e.g., the voltage $V_{chip}$ across the IC chip 100) is equal to the first terminal voltage minus the second terminal voltage.

According to yet another embodiment, a two-terminal IC chip (e.g., the IC chip 100 and/or the IC chip 300) includes a first chip terminal (e.g., the terminal 110 and/or the terminal 310) and a second chip terminal (e.g., the terminal 112 and/or the terminal 312). The first chip terminal is coupled to a first winding terminal (e.g., the terminal 212) of an inductive winding (e.g., the inductive winding 210) and a first diode terminal (e.g., the terminal 224) of a diode (e.g., the diode 220). The inductive winding further includes a second winding terminal (e.g., the terminal 214), and the diode further includes a second diode terminal (e.g., the terminal 222). A series of one or more light emitting diodes (e.g., the one or more LEDs 290) is coupled to the second winding terminal and the second diode terminal. The second winding terminal and the second diode terminal are configured to receive a rectified AC voltage (e.g., the rectified voltage 252). The chip (e.g., the IC chip 100 and/or the IC chip 300) is configured to receive an input voltage (e.g., the voltage 256) at the first chip terminal and generate a chip current (e.g., the current 254) based at least in part on the input voltage, and the chip current is larger than or equal to zero in magnitude. Additionally, the chip is further configured to allow the chip current to flow into the chip at the first chip terminal and out of the chip at the second chip terminal, or to flow into the chip at the second chip terminal and out of the chip at the first chip terminal, and change the chip current with respect to time to keep the light-emitting-diode current (e.g., the current 296) constant with respect to time even if the input voltage (e.g., the voltage 256) changes within a voltage range and a temperature for the chip (e.g., the temperature of the IC chip 100 and/or the IC chip 300) changes within a temperature range. The chip (e.g., the IC chip 100 and/or the IC chip 300) is an integrated circuit, and the chip does not include any additional chip terminal other than the first chip terminal and the second chip terminal. For example, the two-terminal IC chip is implemented according to at least FIG. 1, FIG. 2, and/or FIG. 3.

In another example, the two-terminal IC chip is further configured to periodically change the chip current with respect to time and within each period, change the chip current with respect to time, to keep the light-emitting-diode current constant with respect to time even if the input voltage changes within the voltage range and the temperature for the chip changes within the temperature range. In yet another example, the temperature range includes an upper temperature limit equal to 150° C. and a lower temperature limit equal to −40° C. In yet another example, the voltage range includes an upper voltage limit equal to 370 V and a lower voltage limit equal to 126 V.

According to yet another embodiment, a two-terminal IC chip (e.g., the IC chip 100 and/or the IC chip 300) for an electronic system (e.g., the LED driver 200) includes a first chip terminal (e.g., the terminal 110 and/or the terminal 310) and a second chip terminal (e.g., the terminal 112 and/or the terminal 312). The first chip terminal is coupled to one or more components (e.g., the inductive winding 210 and/or the diode 220) of the electronic system (e.g., the LED driver 200). The electronic system (e.g., the LED driver 200) is configured to receive a first signal (e.g., the AC voltage 250) and generate a second signal (e.g., the current 296) based on at least information associated with the first signal. The chip (e.g., the IC chip 100 and/or the IC chip 300) is configured to receive an input voltage (e.g., the voltage 256) at the first chip terminal (e.g., the terminal 110) and generate a chip current (e.g., the current 254) based at least in part on the input voltage. The chip current is larger than or equal to zero in magnitude. Additionally, the chip is further configured to allow the chip current to flow into the chip at the first chip terminal and out of the chip at the second chip terminal, or to flow into the chip at the second chip terminal and out of the chip at the first chip terminal, and change the chip current with respect to time to keep the electronic system (e.g., the LED driver 200) operating normally even if the first signal (e.g., the AC voltage 250) changes. The chip is an integrated circuit, and the chip does not include any additional chip terminal other than the first chip terminal and the second chip terminal. For example, the two-terminal IC chip is implemented according to at least FIG. 1, FIG. 2, and/or FIG. 3.

In another example, the two-terminal IC chip (e.g., the IC chip 100 and/or the IC chip 300) is further configured to periodically change the chip current with respect to time and within each period, change the chip current with respect to time, to keep the electronic system (e.g., the LED driver 200) operating normally even if the first signal changes. In another example, the first signal is a voltage signal (e.g., the AC voltage 250), and the second signal is a current signal (e.g., the current 296). In yet another example, the two-terminal IC chip is further configured to change the chip current with respect to time to keep the current signal (e.g., the current 296) constant in magnitude with respect to time even if the voltage signal (e.g., the AC voltage 250) changes in magnitude. In yet another example, the two-terminal IC chip is further configured to periodically change the chip current with respect to time and within each period, change the chip current with respect to time, to keep the current signal (e.g., the current 296) constant in magnitude with respect to time even if the voltage signal (e.g., the AC voltage 250) changes in magnitude. In yet another example, the two-terminal IC chip (e.g., the IC chip 100 and/or the IC chip 300) is a controller for the electronic system (e.g., the LED driver 200).

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A two-terminal IC chip, the chip comprising:
   a first chip terminal pin; and
   a second chip terminal pin;
   wherein:
      a first terminal voltage is a voltage of the first chip terminal pin;
      a second terminal voltage is a voltage of the second chip terminal pin; and
      a chip voltage is equal to a difference between the first terminal voltage and the second terminal voltage;
   wherein the chip is configured to:
      allow a chip current to flow into the chip at the first chip terminal pin and out of the chip at the second chip terminal pin, or to flow into the chip at the second chip terminal pin and out of the chip at the first chip terminal pin, the chip current being larger than or equal to zero in magnitude;
      allow the chip current flowing into the chip at the first chip terminal pin to power one or more internal power supplies; and
      change a relationship between the chip voltage and the chip current with respect to time;
   wherein:
      the chip is an integrated circuit;
      the chip does not include any additional chip terminal pins other than the first chip terminal pin and the second chip terminal pin; and
      the first chip terminal pin and the second chip terminal pin are the only chip terminal pins of the chip that provide interconnections between internal circuits of the chip and an external environment.

2. The two-terminal IC chip of claim 1 is further configured to:
   periodically change the relationship between the chip voltage and the chip current with respect to time; and
   within each period, change the relationship between the chip voltage and the chip current with respect to time.

3. The two-terminal IC chip of claim 1, and further comprising:
   a switch; and
   a resistor coupled to the switch;

wherein the switch is configured to:
receive a drive signal; and
be opened or closed in response to the drive signal;
wherein the chip is further configured to:
in response to the switch being opened, change the chip current from being larger than zero to being equal to zero in magnitude; and
in response to the switch being closed, change the chip current from being equal to zero to being larger than zero in magnitude.

4. The two-terminal IC chip of claim 3 wherein the chip is further configured to, in response to the switch being closed, allow the chip current to flow through the switch and the resistor, the chip current being larger than zero in magnitude.

5. The two-terminal IC chip of claim 3 wherein the drive signal is a pulse-width-modulation signal corresponding to a pulse width for each modulation period.

6. The two-terminal IC chip of claim 5, and further comprising:
a driver configured to receive a first signal and a second signal and generate the drive signal;
wherein the driver is further configured to:
in response to the first signal indicating an end of a demagnetization period, change the drive signal to start the pulse width; and
in response to the second signal indicating the chip current has reached or exceeded a predetermined current limit, change the drive signal to end the pulse width.

7. The two-terminal IC chip of claim 6 wherein the driver is further configured to:
in response to the first signal indicating the end of the demagnetization period, change the drive signal to close the switch and increase the chip current from zero in magnitude; and
in response to the second signal indicating the chip current has reached or exceeded the predetermined current limit, change the drive signal to open the switch and decrease the chip current to zero in magnitude.

8. The two-terminal IC chip of claim 1 wherein the first chip terminal pin is coupled to a first winding terminal of an inductive winding and a first diode terminal of a diode, the inductive winding further including a second winding terminal, the diode further including a second diode terminal, a series of one or more light emitting diodes being coupled to the second winding terminal and the second diode terminal, the second diode terminal being configured to receive a rectified AC voltage.

9. The two-terminal IC chip of claim 8 is further configured to receive the first terminal voltage at the first chip terminal pin and generate the chip current based at least in part on the first terminal voltage.

10. The two-terminal IC chip of claim 9 wherein the chip current is configured to flow between the first chip terminal pin and the second chip terminal pin to affect a light-emitting-diode current flowing through the series of the one or more light emitting diodes.

11. The two-terminal IC chip of claim 10 is further configured to change the chip current with respect to time to keep the light-emitting-diode current constant with respect to time.

12. The two-terminal IC chip of claim 11 is further configured to periodically change the chip current with respect to time and within each period, change the chip current with respect to time, to keep the light-emitting-diode current constant with respect to time.

13. The two-terminal IC chip of claim 1, and further comprising:
a controlled switch configured to receive a control signal; and
a power supply coupled to the controlled switch;
wherein the controlled switch is further configured to be:
closed during a first time duration in response to the control signal; and
open during a second time duration in response to the control signal;
wherein the power supply is configured to:
in response to the controlled switch being closed, receive a first power through the controlled switch and store the received first power during the first time duration; and
in response to the controlled switch being open, not store any additional power and not allow stored power to leak out through the controlled switch during the second time duration;
wherein the power supply is further configured to output a second power during the first time duration and the second time duration.

14. The two-terminal IC chip of claim 1 wherein the chip voltage is equal to the first terminal voltage minus the second terminal voltage.

15. A two-terminal IC chip, the chip comprising:
a first chip terminal pin;
a second chip terminal pin; and
a first switch;
wherein the chip is configured to:
allow a chip current to flow into the chip at the first chip terminal pin and out of the chip at the second chip terminal pin, or to flow into the chip at the second chip terminal pin and out of the chip at the first chip terminal pin, the chip current being larger than or equal to zero in magnitude; and
allow the chip current flowing into the chip at the first chip terminal pin to power one or more internal power supplies;
wherein the first switch is configured to:
receive a drive signal; and
be opened or closed in response to the drive signal;
wherein the chip is further configured to:
in response to the first switch being opened, change the chip current from being larger than zero to being equal to zero in magnitude; and
in response to the first switch being closed, change the chip current from being equal to zero to being larger than zero in magnitude;
wherein:
the chip is an integrated circuit;
the chip does not include any additional chip terminal pins other than the first chip terminal pin and the second chip terminal pin; and
the first chip terminal pin and the second chip terminal pin are the only chip terminal pins of the chip that provide interconnections between internal circuits of the chip and an external environment.

16. The two-terminal IC chip of claim 15 wherein the drive signal is a pulse-width-modulation signal corresponding to a pulse width for each modulation period.

17. The two-terminal IC chip of claim 16, and further comprising:
a driver configured to receive a first signal and a second signal and generate the drive signal;

wherein the driver is further configured to:
in response to the first signal indicating an end of a demagnetization period, change the drive signal to start the pulse width; and
in response to the second signal indicating the chip current has reached or exceeded a predetermined current limit, change the drive signal to end the pulse width.

18. The two-terminal IC chip of claim 17 wherein the driver is further configured to:
in response to the first signal indicating the end of the demagnetization period, change the drive signal to close the first switch and increase the chip current from zero in magnitude; and
in response to the second signal indicating the chip current has reached or exceeded the predetermined current limit, change the drive signal to open the first switch and decrease the chip current to zero in magnitude.

19. The two-terminal IC chip of claim 15 wherein the first chip terminal pin is coupled to a first winding terminal of an inductive winding and a first diode terminal of a diode, the inductive winding further including a second winding terminal, the diode further including a second diode terminal, a series of one or more light emitting diodes being coupled to the second winding terminal and the second diode terminal, the second diode terminal being configured to receive a rectified AC voltage.

20. The two-terminal IC chip of claim 19 is further configured to receive an input voltage at the first chip terminal pin and generate the chip current based at least in part on the received input voltage.

21. The two-terminal IC chip of claim 20 wherein the chip current is configured to flow between the first chip terminal pin and the second chip terminal pin to affect a light-emitting-diode current flowing through the series of the one or more light emitting diodes.

22. The two-terminal IC chip of claim 21 is further configured to change the chip current with respect to time to keep the light-emitting-diode current constant with respect to time.

23. The two-terminal IC chip of claim 22 is further configured to periodically change the chip current with respect to time and within each period, change the chip current with respect to time, to keep the light-emitting-diode current constant with respect to time.

24. The two-terminal IC chip of claim 15, and further comprising:
a second switch configured to receive a control signal; and
a power supply coupled to the second switch;
wherein the second switch is further configured to be:
closed during a first time duration in response to the control signal; and
open during a second time duration in response to the control signal;
wherein the power supply is configured to:
in response to the second switch being closed, receive a first power through the second switch and store the received first power during the first time duration; and
in response to the second switch being open, not store any additional power and not allow stored power to leak out through the second switch during the second time duration;
wherein the power supply is further configured to output a second power during the first time duration and the second time duration.

25. A two-terminal IC chip, the chip comprising:
a first chip terminal pin; and
a second chip terminal pin;
wherein the first chip terminal pin is coupled to a first winding terminal of an inductive winding and a first diode terminal of a diode, the inductive winding further including a second winding terminal, the diode further including a second diode terminal, a series of one or more light emitting diodes being coupled to the second winding terminal and the second diode terminal, the second winding terminal and the second diode terminal being configured to receive a rectified AC voltage;
wherein the chip is configured to:
receive an input voltage at the first chip terminal pin and generate a chip current based at least in part on the input voltage, the chip current being larger than or equal to zero in magnitude;
allow the chip current to flow into the chip at the first chip terminal pin and out of the chip at the second chip terminal pin, or to flow into the chip at the second chip terminal pin and out of the chip at the first chip terminal pin;
allow the chip current flowing into the chip at the first chip terminal pin to power one or more internal power supplies; and
change the chip current with respect to time to keep a light-emitting-diode current constant with respect to time even if the input voltage changes within a voltage range and a temperature for the chip changes within a temperature range;
wherein:
the chip is an integrated circuit;
the chip does not include any additional chip terminal pins other than the first chip terminal pin and the second chip terminal pin; and
the first chip terminal pin and the second chip terminal pin are the only chip terminal pins of the chip that provide interconnections between internal circuits of the chip and an external environment.

26. The two-terminal IC chip of claim 25 is further configured to periodically change the chip current with respect to time and within each period, change the chip current with respect to time, to keep the light-emitting-diode current constant with respect to time even if the input voltage changes within the voltage range and the temperature for the chip changes within the temperature range.

27. The two-terminal IC chip of claim 25 wherein the temperature range includes an upper temperature limit equal to 150° C. and a lower temperature limit equal to −40° C.

28. The two-terminal IC chip of claim 25 wherein the voltage range includes an upper voltage limit equal to 370 V and a lower voltage limit equal to 126 V.

29. A two-terminal IC chip for an electronic system, the chip comprising:
a first chip terminal pin; and
a second chip terminal pin;
wherein the first chip terminal pin is coupled to one or more components of the electronic system, the electronic system being configured to receive a first signal and generate a second signal based on at least information associated with the first signal;
wherein the chip is configured to:
receive an input voltage at the first chip terminal pin and generate a chip current based at least in part on the input voltage, the chip current being larger than or equal to zero in magnitude;

allow the chip current to flow into the chip at the first chip terminal pin and out of the chip at the second chip terminal pin, or to flow into the chip at the second chip terminal pin and out of the chip at the first chip terminal pin;

allow the chip current flowing into the chip at the first chip terminal pin to power one or more internal power supplies; and change the chip current with respect to time to keep the electronic system operating normally even if the first signal changes;

wherein:

the chip is an integrated circuit;

the chip does not include any additional chip terminal pins other than the first chip terminal pin and the second chip terminal pin; and the first chip terminal pin and the second chip terminal pin are the only chip terminal pins of the chip that provide interconnections between internal circuits of the chip and an external environment.

30. The two-terminal IC chip of claim 29 is further configured to periodically change the chip current with respect to time and within each period, change the chip current with respect to time, to keep the electronic system operating normally even if the first signal changes.

31. The two-terminal IC chip of claim 29 wherein:

the first signal is a voltage signal; and the second signal is a current signal.

32. The two-terminal IC chip of claim 31 is further configured to change the chip current with respect to time to keep the current signal constant in magnitude with respect to time even if the voltage signal changes in magnitude.

33. The two-terminal IC chip of claim 32 is further configured to periodically change the chip current with respect to time and within each period, change the chip current with respect to time, to keep the current signal constant in magnitude with respect to time even if the voltage signal changes in magnitude.

34. The two-terminal IC chip of claim 29 is a controller for the electronic system.

* * * * *